United States Patent [19]
Sattelmeyer et al.

[11] Patent Number: 4,652,612
[45] Date of Patent: Mar. 24, 1987

[54] RUBBER MIXTURES, AND RUBBER ARTICLES AND MOTOR VEHICLE TIRES PRODUCED THEREFROM

[75] Inventors: Richard Sattelmeyer; Joachim Weil, both of Wiesbaden, Fed. Rep. of Germany

[73] Assignee: Hoechst Aktiengesellschaft, Fed. Rep. of Germany

[21] Appl. No.: 688,749

[22] Filed: Jan. 4, 1985

[30] Foreign Application Priority Data

Jan. 7, 1984 [DE] Fed. Rep. of Germany ....... 3400365
Dec. 4, 1984 [DE] Fed. Rep. of Germany ....... 3444087

[51] Int. Cl.$^4$ .......... C08L 21/00; C08L 7/00; C08L 33/26; C08L 33/24
[52] U.S. Cl. .................. 525/215; 525/211; 525/218; 524/519; 524/521
[58] Field of Search .................. 525/218, 211, 215

[56] References Cited

U.S. PATENT DOCUMENTS

| | | | |
|---|---|---|---|
| 3,950,281 | 4/1976 | Usamoto | 525/211 |
| 3,965,055 | 6/1976 | Shichman | 525/218 |
| 4,082,705 | 4/1978 | Beede | 525/218 |
| 4,222,923 | 9/1980 | Rhodes | 525/215 |
| 4,421,900 | 12/1983 | Hamed | 525/215 |
| 4,472,463 | 9/1984 | Solomon | 525/218 |
| 4,584,348 | 4/1986 | Nagano | 525/211 |

Primary Examiner—C. Warren Ivy
Attorney, Agent, or Firm—Bierman and Muserlian

[57] ABSTRACT

Rubber mixtures which can be easily processed and have good mechanical properties and are based on synthetic and/or natural grades of rubber, the usual additives also being used, contain a copolymer with a melt viscosity of not more than 150 Pa.s., measured at 180° C., of (a) 20 to 100% by weight of at least one alkyl ester of $\alpha,\beta$-ethylenically unsaturated mono- and/or di-carboxylic acids which contains 1 to 12 carbon atoms in the alcohol radical, (b) 0 to 20% by weight of at least one amide of $\alpha,\beta$-ethylenically unsaturated mono- and/or di-carboxylic acids, (c) 0 to 15% by weight of at least one $\alpha,\beta$-ethylenically unsaturated mono- and/or di-carboxylic acid and (d) 0 to 50% by weight of at least one other $\alpha,\beta$-ethylenically unsaturated copolymerizable monomeric compound, the sum of the percentages in each case being 100. Rubber articles and motor vehicle tires with very good mechanical properties can be produced from these rubber mixtures.

16 Claims, No Drawings

RUBBER MIXTURES, AND RUBBER ARTICLES AND MOTOR VEHICLE TIRES PRODUCED THEREFROM

According to the prior art, rubber mixtures are prepared with the aid of mixing units in which the tough, firm, rubbery-elastic polymers are intensively mixed with the other components with the application of high shearing forces. The work to be expended and the time taken are of great importance for the profitability of the mixing process, so that a reduction in the energy and time consumed is desirable and is a continuous aim. Since many vulcanized products produced from the rubber mixtures, such as tubes, vehicle tyres, conveyor belts and V-belts, are not produced from one blank by itself but are composed of various parts of different formulations, the mixtures of these individual parts are required to have a certain tackiness so that they can be joined together to give a temporarily stable blank. In addition, an improvement in the mechanical properties, such as tear strength, elongation at break, stress values and the like, is also to be aimed for in the end product.

The invention relates to rubber mixtures which can easily be processed and have good mechanical properties and are based on synthetic and/or natural grades of rubber with simultaneous use of the usual additives, which contain a copolymer with a melt viscosity of not more than 150 Pa.s, measured at 180° C., of (a) 20 to 100% by weight, preferably 40 to 95% by weight, of at least one alkyl ester of $\alpha$-$\beta$-ethylenically unsaturated mono- and/or di-carboxylic acids which contains 1 to 12 carbon atoms in the alcohol radical, (b) 0 to 20% by weight, preferably 0.5 to 15% by weight, of at least one amide of $\alpha,\beta$-ethylenically unsaturated mono- and/or di-carboxylic acids, (c) 0 to 15% by weight, preferably 0.2 to 10% by weight, of at least one $\alpha,\beta$-ethylenically unsaturated mono- and/or di-carboxylic acid and (d) 0 to 50% by weight, preferably 0 to 30% by weight, of at least one other $\alpha,\beta$-ethylenically unsaturated copolymerizable monomeric compound, the sum of the percentages in each case being 100.

According to the invention, a significant advance both in the preparation of the mixture and in the production of blanks and, furthermore, in respect of the mechanical properties of the end products can be achieved by also using copolymers of unsaturated acids, in comparison with the sole use of the other components of the usual rubber mixtures. Depending on the nature of the recipe of the rubber mixture, the industrial advantages mentioned may occur individually, or in particular, together.

It is particularly surprising that vulcanized products of the rubber mixtures according to the invention, in spite of the thermoplastic copolymer contained therein, do not suffer from noticeably greater deformation under the action of heat both under static stress (measured by the permanent set) and under the effects of dynamic force (for example in Goodrich flexometers) than comparable vulcanized products containing no copolymer. Surprisingly, the hardness of the vulcanized products is also not reduced by the copolymer. Equally unexpected is the scarcely noticeable increase in temperature in the vulcanized products produced using the rubber mixtures according to the invention when subjected to dynamic stress in the Goodrich flexometer, even though the good buffing characteristics found on measurement of the resilience suggested high absorption of energy. The processability of rubber mixtures based on butyl rubber in mixing units, for example on roll mills, is improved to a very considerable degree by the addition, according to the invention, of copolymers, this improvement not arising when other polymers, for example polychloroprene, are added.

The melt viscosity of the copolymer is preferably not more than 100 Pa.s, in particular not more than 70 Pa.s. (180° C.). Furthermore, preferably, at least one component (b) or (c) is present, the total amount of component (b) and (c) preferably being between 5 and 15% by weight.

The invention also relates to rubber articles and motor vehicle tyres which have been produced by vulcanization from the abovementioned mixtures.

Examples of suitable alkyl radicals of the ester component (a) are the methyl, ethyl, propyl, butyl, hexyl, octyl, such as 2-ethylhexyl, decyl and dodecyl groups and isomers thereof. Component (a) is advantageously 2-ethylhexyl acrylate or a mixture thereof with butyl acrylate, or a content of more than 50% by weight of 2-ethylhexyl acrylate or a mixture thereof with butyl acrylate in a mixture with other esters of component (a). This particularly applies in the case where the copolymer is formed from component (a) alone. In this mixture of the two esters, the content of butyl acrylate is, for example, up to 70% by weight, preferably 10–50% by weight, based on the sum of these esters. Butyl acrylate is understood here as meaning n-, sec.-, tert.- and iso-butyl acrylate, n-butyl acrylate being preferred.

Suitable amides (b) are the monoamides and/or diamides of the acids mentioned and the monoamides of the unsaturated dicarboxylic acid monoesters mentioned for (a) with 1–12 carbon atoms in the alkyl group. The amides are preferably unsubstituted on the nitrogen atom.

The carboxylic acid units of components (a) to (c) are preferably derived from acids with 3–5 carbon atoms. Examples of suitable carboxylic acids are crotonic acid, itaconic acid, maleic acid and/or fumaric acid, and monomers which contain carboxyl groups and are derived from styrene, but preferably acrylic acid and/or methacrylic acid.

Examples of suitable compounds (d) are styrene, $\alpha$-methylstyrene, the various vinyltoluenes, ethylene, propylene, vinyl acetate and/or vinyl chloride.

According to a preferred embodiment, a copolymer is used which is built up from (a) 55 to 65% of 2-ethylhexylacrylate, 15 to 30% of butyl acrylate and 3 to 15% of methyl methacrylate, (b) 2 to 10% of acrylamide and (c) 0.3 to 5% of acrylic acid, the sum of (b) and (c) preferably being at least 5% (in each case % by weight).

The copolymers are in general used in the rubber mixtures in an amount of 0.5 to 150% by weight, preferably 1 to 100% by weight and in particular 1.5 to 50% by weight, based on the amount of rubbers employed.

The copolymers can be prepared in the usual manner, for example by solution or bulk polymerization in the presence of polymerization initiators and, if appropriate, also chain regulators. Suitable initiators are the customary peroxides, such as di-tert.-butyl, dicumyl, dibenzoyl and methylethylketoneperoxide, and also tert.-butylperbenzoate, in each case individually or as a mixture, or azoisobutyronitrile. The polymerization is advantageously carried out in suitable solvents, for example aromatic hydrocarbons, such as toluene and xylene and mixtures thereof with saturated hydrocarbons, such as cyclohexane or benzine fractions, and/or mixtures with alcohols. To isolate the solid copolymers, the solvents are as a rule removed by distillation at elevated temperature, i.e. to about 200° C., if necessary under reduced pressure, when the polymerization has ended. If appropriate, the reaction solution obtained after the polymerization can also first be freed from the product after addition to other chemicals or auxiliaries which are also used in rubber mixtures (such as softening agents or resins), so that the copolymer is present as a solvent-free mixture with the other substance and can be used in this form.

The rubber mixtures can be prepared on the basis of the customary grades of rubber, such as natural, butadiene/styrene, butadiene/acrylonitrile, polybutadiene, polyisoprene, butyl, chloro- or bromo-butyl or ethylene/propylene/diene terpolymer (EPDM) rubber or mixtures thereof, such as are usually employed in the rubber industry.

Examples of customary additives are fillers, pigments, processing auxiliaries, softeners, plasticizers, resins, vulcanizing agents, accelerators and activators. Suitablle fillers are the commercially available carbon blacks and silicas, and furthermore kaolins, chalk and the like; examples of suitable pigments are iron oxides and phthalocyanines. Examples of suitable processing auxiliaries are zinc oxide, stearic acid, anti-ageing agents and the like, and, if appropriate, also blowing agents and additives which improve adhesion, such as metal salts, for example cobalt naphthenate or other salts of metal cations with saturated or olefinically unsaturated organic acids, if appropriate in the form of polymers containing acid groups, such as ion exchangers.

Examples of softeners and plasticizers which can be used are mineral oils and/or high-boiling dicarboxylic acid esters and/or glycols. Possible resins are, for example, phenolic resins which, in the form of novolacs and the customary hardening agents added separately or together, such as hexamethylenetetramine and/or reactive melamine resins, are used for reinforcing or, in the case of the non-hardenable phenolic resins, for tackifying. Other resins, such as colophony and derivatives thereof, hydrocarbon resins and butylphenol/acetylene addition products, can be used as tackifying agents.

The vulcanization can be carried out either with sulfur and suitable customary additives or without sulfur and with vulcanization resins or, in certain cases, for example in the case of EPDM rubber, with peroxides. However, vulcanization in the presence of sulfur is preferred for natural, butadiene, styrene, butadiene/acrylonitrile, polybutadiene and polyisoprene rubber. The course of the vulcanization can be matched to the requirements in practice by choosing suitable additives which are customary in rubber technology, such as accelerators, activators and regulators.

Since, because of the presence of reactive groups (carboxyl and carboxamide groups), the copolymers according to the invention can undergo crosslinking reactions, admixing of suitable crosslinking agents, such as methylene group donors (paraformaldehyde and/or hexamethylenetetramine and the like) and/or compounds containing amine and/or methylol and/or hydroxyl groups, for example partly etherified melamine resins, which thus still contain free methylol groups, is sometimes recommended.

The rubber mixtures according to the invention are mixed in the customary manner in internal mixers or on mills. It is advisable here to add the copolymers already at the start of the mixing operation in order to shorten the time taken to incorporate the other components and for rapid formation of the hide on the mills. Further processing of the crude mixtures and vulcanization can be carried out by customary processes.

The vulcanized products obtained according to the invention can be used, for example, as industrial rubber goods, such as buffering elements, rubber collars, linings, tubes, conveyor belts and V-belts, and also for motor vehicle tyres. The experiments described below serve to illustrate the composition and properties of the vulcanized products obtained according to the invention. P denotes parts by weight.

EXAMPLES

I. Preparation of the copolymers

A. A mixture of 1 P of acrylic acid, 6 P of acrylamide, 9 P of methyl methacrylate, 61 P of 2-ethylhexyl acrylate and 23 P of n-butyl acrylate was copolymerized in a mixture of toluene, cyclohexane and isobutanol (3:3:1), using 0.5 P of di-tert.-butyl peroxide, at 100° to 130° C., and the solvent mixture was removed by distillation, finally at 180° to 190° C. under reduced pressure (50 mbar). The yield was more than 99%; melt viscosity; 45 Pa.s. at 180° C.

B. The polymerization described under A was repeated with the addition of 1% of n-dodecylmercaptan as a molecular-weight regulator. Melt viscosity: 25 Pa.s. at 180° C.

C. 2.9 P of acrylic acid, 5.8 P of acrylamide, 8 P of methyl methacrylate, 62.3 P of 2-ethylhexyl acrylate and 21 P of n-butyl acrylate were copolymerized in the manner described under A. After the solvent had been separated off, the yield, based on the monomers employed, was more than 98%. The resulting resilient synthetic resin had a melt viscosity of 34 Pa.s. at 180° C.

II. Use of the copolymers in rubber mixtures

The copolymers obtained according to A to C were tested in rubber mixtures.

(1) The mixtures were based on a butyl rubber commercially available under the tradename Esso-Butyl 286; the rubber was introduced into a laboratory roll mill by itself, for the comparison, and, on the other hand, with copolymer A. The time taken to form a rolled hide was recorded. Processing of the rubber was simpler and more rapid the faster as complete as possible a hide was formed.

TABLE 1

|  | Example 1 | Comparison 1 |
| --- | --- | --- |
| Composition (P) |  |  |
| Butyl rubber | 285 | 300 |
| Copolymer A | 15 | — |
| Course of the experiment (time sequence): |  |  |
| 0 min start = introduction of the butyl rubber | + | + |
| 2 mins introduction of the copolymer | + | — |
| 5 mins | Hide formed | No hide formed |
| 10 mins | Hide runs | " |
| 15 mins | " | " |

Higher amounts of the copolymer caused no considerable shortening of the time taken for the hide to form, but resulted in an even smoother and more homogeneous structure and better handling on the mill.

(2) When Example 1 and Comparison 1 were repeated with natural rubber, a complete hide was likewise formed in a short time only in the presence of the copolymer.

(3) When Example 1 was repeated with and without the addition (Comparison 2) of the copolymer and incorporation of a total of 150 P of carbon black in portions was started after about 10 minutes, about half the processing time was required on the roll mill to form a hide with the mixture according to the invention in relation to Comparison 2.

(4 to 6) To illustrate the effect of adding the copolymer to styrene/butadiene rubber (SBR) on the mechanical properties of the vulcanized products, mixtures containing no fillers were prepared according to Examples 4 to 6 and Comparison 3 and were tested after vulcanization for 30 minutes at 155° C.

TABLE 2

|  | Example | | | Comparison |
|---|---|---|---|---|
|  | 4 | 5 | 6 | 3 |
| Composition (P) | | | | |
| SBR[1] | 95 | 90 | 70 | 100 |
| Copolymer A | 5 | 10 | 30 | — |
| Stearic acid | 1.5 | 1.5 | 1.5 | 1.5 |
| Zinc oxide | 3 | 3 | 3 | 3 |
| Anti-ageing agents[2] | 2 | 2 | 2 | 2 |
| Sulfur | 1.14 | 1.08 | 0.84 | 1.20 |
| Benzothiazyl-2-cyclohexyl-sulfenamide | 0.95 | 0.90 | 0.70 | 1 |
| Dithiodimorpholine | 0.95 | 0.90 | 0.70 | 1 |
| Test results | | | | |
| Mooney plasticity 120° C. (MU) (L 1 + 4) | 22 | 19 | 7 | 24 |
| Tear strength (MPa) | 2.1 | 2.4 | 1.9 | 1.6 |
| Elongation at break (%) | 266 | 318 | 358 | 179 |
| Tensile strength value: | | | | |
| 100% elongation (MPa) | 1.1 | 1.1 | 0.8 | 1.2 |
| 200% elongation (MPa) | 1.6 | 1.5 | 1.1 | — |
| 300% elongation (MPa) | — | 1.7 | 1.4 | — |
| Resilience 23° (%) | 50 | 42 | 26 | 59 |
| Shore A hardness 23° (°) | 41 | 40 | 31 | 43 |
| Angular notched impact strength (N/mm) | 5.27 | 5.80 | 7.11 | 4.87 |

[1] Commercially available, with 23.5% of bonded styrene.
[2] 1 P of N—isopropyl-N'phenyl-p-phenylenediamine and 1 P of a non-discoloring quinoline derivative.

(7 and 8) Filler-containing mixtures of natural rubber or styrene/butadiene rubber with added copolymer A (Examples 7 and 8) and Comparisons 4 and 5 were prepared and tested as described in Examples 4 to 6.

TABLE 3

|  | Ex. 7 | Comp. 4 | Ex. 8 | Comp. 5 |
|---|---|---|---|---|
| Composition (P) | | | | |
| Natural rubber | 95 | 100 | — | — |
| SBR[3] | — | — | 95 | 100 |
| Copolymer A | 5 | — | 5 | — |
| Carbon black | 50 | 50 | 50 | 50 |
| Zinc oxide | 5 | 5 | 5 | 5 |
| Stearic acid | 1.5 | 1.5 | 1.5 | 1.5 |
| Anti-ageing agents[3] | 2 | 2 | 2 | 2 |
| Sulfur | 2.5 | 2.5 | 2.5 | 2.5 |
| Benzothiazyl-2-cyclohexylsulfenamide | 0.9 | 0.9 | 0.9 | 0.9 |
| Tetramethylthiuram monosulfide | 0.3 | 0.3 | 0.3 | 0.3 |
| Test results | | | | |
| Mooney plasticity 120° C. (L 1 + 4) (MU) | 45 | 42 | 43 | 46 |
| Vulcanization | (15 min/145° C.) | | (30 min/155° C.) | |
| Tear strength (MPa) | 19.4 | 19.8 | 18.6 | 21.8 |
| Elongation at break (%) | 241 | 245 | 174 | 217 |
| Tensile strength value | | | | |
| 10% elongation (MPa) | 1.6 | 1.7 | 1.9 | 1.8 |
| 25% elongation (MPa) | 2.4 | 2.4 | 2.7 | 2.4 |
| 50% elongation (MPa) | 3.8 | 3.8 | 4.2 | 3.7 |
| 100% elongation (MPa) | 7.5 | 7.6 | 9.3 | 7.9 |
| 200% elongation (MPa) | 16.0 | 16.2 | — | 18.6 |
| 300% elongation (MPa) | — | — | — | — |
| Resilience 23° C./70° C. (%) | 37/51 | 43/56 | 32/45 | 35/45 |
| Shore A hardness 23° C./70° C. (°) | 73/71 | 73/70 | 75/75 | 75/70 |
| Angular notched impact strength (N/mm) | 37.0 | 42.0 | 15.4 | 17.5 |
| Permanent set (%) | 43.1 | 40.1 | 35.1 | 31.3 |
| Goodrich flexometer residual deformation (%) | 2.9 | 3.1 | 3.1 | 2.7 |
| Increase in temperature (°C.) | 20 | 19 | 27 | 26 |

[3] as in Table 2

The results clearly show the advantageous properties of the rubber mixtures prepared also using the copolymers. Thus, Examples 1 and 2 show the rapid formation of the hide, which enables time and energy to be saved during preparation of the mixture. Examples 4 and 6 demonstrate the better processibility with the aid of the lower values for the Mooney plasticity of the mixtures, and clearly show the more advantageous mechanical properties in respect of tear strength and, in particular, elongation at break in relation to Comparison 3. In addition, an improvement in the angular notched impact strength occurs. In the case of mixtures containing filler, only about half of the processing time is required for formation of a hide on the roll mill when the copolymers are employed. The production of the rubber goods produced from the mixtures is thereby increased.

In the results of Examples 7 and 8, which were obtained using mixtures containing fillers, no noticeable changes in the values in relation to Comparisons 4 and 5 are found in respect of increase in temperature and residual deformation under the action of dynamic force in the Goodrich flexometer and in the case of the permanent set. These properties of the examples according to the invention are surprising, since marked deformation and a clear increase in temperature would be expected as a result of the addition of the thermoplastic copolymer. A clear reduction in the resilience is also to be found, which indicates increased buffering properties. Furthermore, when the copolymer is used in the rubber mixture, the same vulcanization hardnesses are obtained as with the formulations of the comparison mixtures, whilst the addition of organic components, for example plasticizers, such as mineral oils, is known to lead to a reduction in hardness.

What is claimed is:

1. A non-aqueous rubber mixture based on (A) a synthetic or natural grade of rubber or both, and (C) customary additives, which contains (B) 0.5 to 150% by weight of a copolymer, based on the amount of the rubber employed, with a melt viscosity of not more than 150 Pa.s., measured at 180° C., of
    (a) 20 to 100% by weight, of at least one alkyl ester of α,β-ethylenically unsaturated mono- or di-carboxylic acids or both which contains 1 to 12 carbon atoms in the alcohol radical and free of nitrogen atoms,
    (b) 0.5 to 20% by weight of at least one amide of α,β-ethylenically unsaturated mono- or di-carboxylic acids or both, (c) 0 to 15% by weight of at least one α,β-ethylenically unsaturated mono- or di-carboxylic acid or both and (d) 0 to 50% by weight of at least one other α,β-ethylenically unsaturated copolymerizable monomeric compound, selected from the group consisting of a styrene, α-methylstyrene, the various vinyltoluenes, ethylene, propylene, vinylacetate, vinylchloride or a mixture thereof, the sum of the percentages in each case being 100.

2. A rubber mixture as claimed in claim 1 the copolymer consisting of 40 to 95% by weight of component (a),
0.5 to 15% by weight of component (b),
0.2 to 10% by weight of component (c) and
0 to 30% by weight of component (d).

3. A rubber mixture as claimed in claim 1, wherein at least one of the components (b) and (c) is copolymerized into the copolymer, the total amount of components (b) and (c) being between 5 and 15% by weight.

4. A rubber mixture as claimed in claim 1, wherein the copolymer consists of (a) 55 to 65% by weight of 2-ethylhexyl acrylate, 15 to 30% by weight of butyl acrylate and 3 to 15% by weight of methyl methacrylate, (b) 2 to 10% by weight of acrylamide and (c) 0.3 to 5% by weight of acrylic acid, the sum of (b) and (c) being at least 5% by weight.

5. A rubber mixture as claimed in claim 1, in which component (a) of the copolymer is a methyl, ethyl, propyl, butyl, hexyl, octyl, 2-ethylhexyl, decyl or dodecyl ester of α,β-ethylenically unsaturated mono- or di-carboxylic acids.

6. A rubber mixture as claimed in claim 1, in which 1 to 100% by weight of the copolymer is used.

7. A rubber mixture as claimed in claim 1, in which 1.5 to 50% by weight of the copolymer is used.

8. A rubber mixture as claimed in claim 1, in which the carboxylic acid units of components (a) to (c) are derived from acids with 3 to 5 carbon atoms.

9. A rubber mixture as claimed in claim 1, in which component (a) is 2-ethylhexyl acrylate or a mixture thereof with butylacrylate and these ester(s) consists of more than 50% by weight in a mixture with other α,β-olefinically unsaturated esters.

10. A rubber mixture as claimed in claim 9 in which n-butylacrylate is used.

11. A rubber mixture as claimed in claim 1, in which component (b) is an amide unsubstituted on the nitrogen atom.

12. A rubber mixture as claimed in claim 1, in which the melt viscosity of the copolymer is not more than 100 Pa.s.

13. A rubber mixture as claimed in claim 12, in which the viscosity of the copolymer is not more than 70 Pa.s.

14. A rubber article or motor vehicle tyre produced by vulcanization of a rubber mixture as claimed in claim 1.

15. A rubber mixture as claimed in claim 8, in which the acids are acrylic acid, methacrylic acid, crotonic acid, itaconic acid, maleic acid or fumaric acid or a mixture thereof.

16. A rubber mixture as claimed in claim 1, in which the rubber is natural, butadiene/styrene, butadiene/acrylonitrile, polybutadiene, polyisoprene, butyl, chloro- or bromo-butyl or ethylene/propylene/diene terpolymer (EPDM) rubber or mixtures thereof.

* * * * *